(No Model.) 2 Sheets—Sheet 1.

J. A. THOMPSON.
SEED PLANTER.

No. 518,014. Patented Apr. 10, 1894.

Witnesses

Inventor
James A. Thompson
Attorneys (No Model.) 2 Sheets—Sheet 2.
J. A. THOMPSON.
SEED PLANTER.
No. 518,014. Patented Apr. 10, 1894.
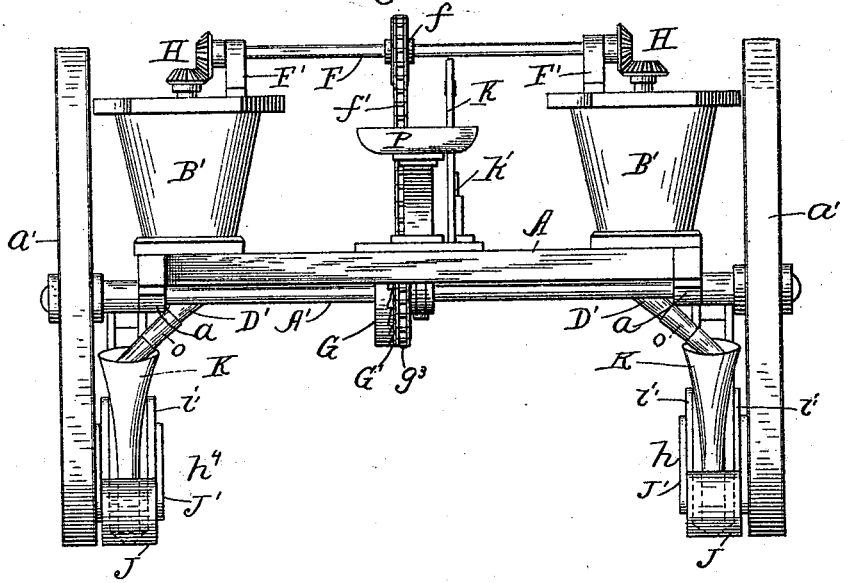
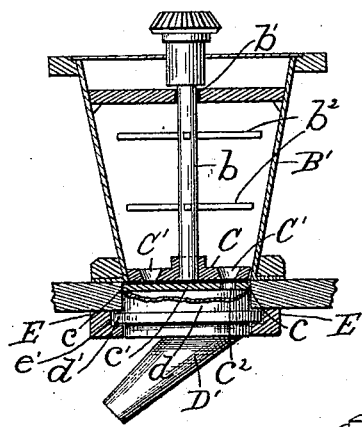
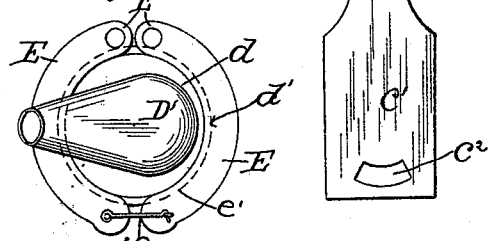
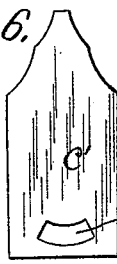
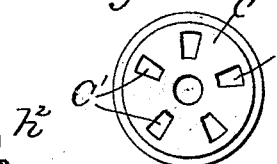
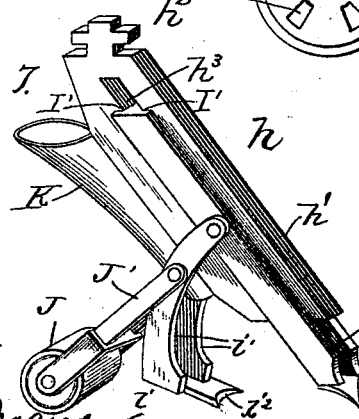
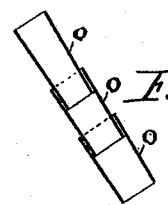
Witnesses
Inventor
James A. Thompson
Attorneys.

UNITED STATES PATENT OFFICE.

JAMES A. THOMPSON, OF GALVESTON, TEXAS.

SEED-PLANTER.

SPECIFICATION forming part of Letters Patent No. 518,014, dated April 10, 1894.

Application filed November 1, 1893. Serial No. 489,703. (No model.)

*To all whom it may concern:*

Be it known that I, JAMES A. THOMPSON, a citizen of the United States, residing at Galveston, in the county of Galveston and State of Texas, have invented certain new and useful Improvements in Seed-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in that class of seed planters wherein a furrow opener and seed dropper are combined in one machine, the digger operating to open a furrow while the dropping mechanism is arranged to deposit the seed in the furrow, and the operation finished by the action of a covering device whereby the furrow is filled and the seed buried; and my object is to produce a machine which will be more effective in operation and which will be much lighter than those formerly in use.

A further object is to render the furrow digging mechanism adjustable to any desired width of row and to such depth of furrows that may be desired.

Figure 1:
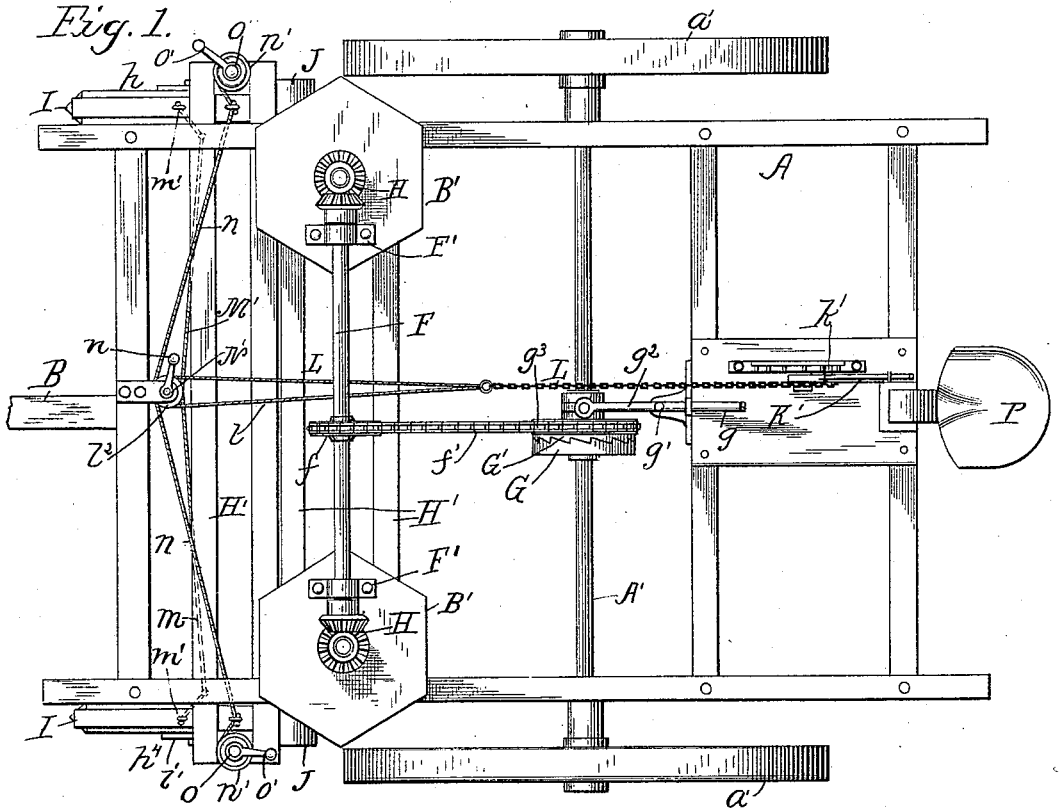
Figure 2:
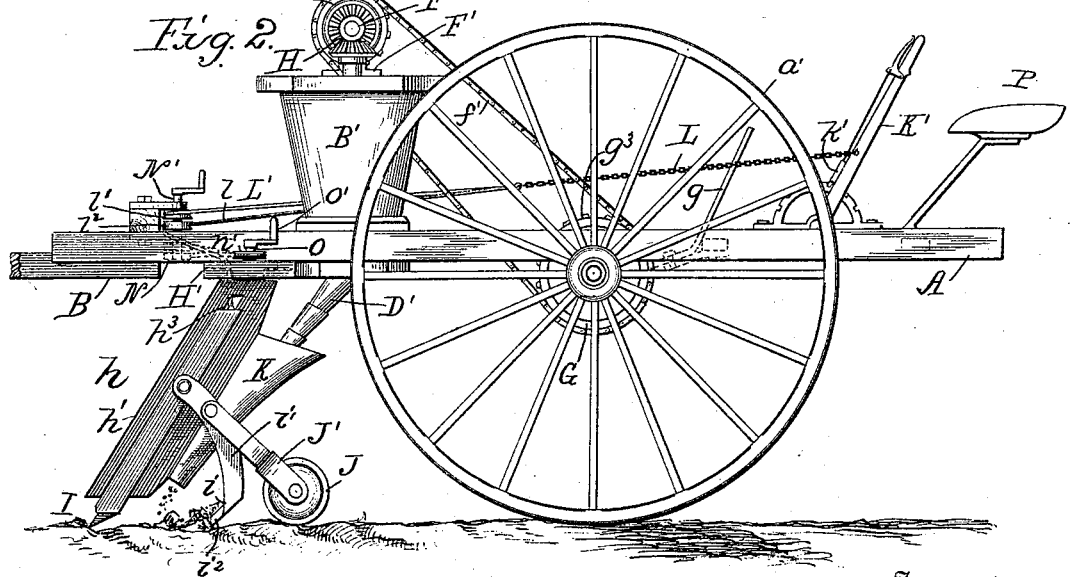

Referring to the accompanying drawings for a detailed description of the invention: Figure 1 represents a plan view thereof; Fig. 2, a side elevation; Fig. 3, a rear elevation; Fig. 4, a sectional view of the seed hopper and dropping mechanism; Fig. 5, a bottom view thereof; Figs. 6 and 8, views of the valve-boards for regulating the supply of seed; Fig. 7, a detail perspective view of the furrow opening mechanism; Fig. 9, a plan view of the dropping plate; and Fig. 10, a view of devices for use as auxiliaries which use will appear fully hereinafter.

The reference letter A indicates the frame of the machine which is constructed preferably of wood and may be in any desired form.

A' is the wheel axle upon which the machine is mounted and which is journaled in boxes $a$, fixed to the under side of the frame and provided at its ends with the usual wheels $a'$, by which the machine is supported. Fixed to the frame A is the draft pole B, to which the team for drawing the machine is attached.

Mounted on the frame A and forward of the axle are the seed hoppers B' which are two in number and which are arranged permanently at or near each side of the machine. These hoppers may be formed of any convenient material, sheet metal being however preferred, and are flaring at the mouth or upper end to facilitate the easy admission of seed. Arranged in the hoppers B' and extending vertically therein their whole length are the revolving shafts or spindles $b$, which are journaled in the boxes $b'$, and provided with radial agitators $b^2$, designed to rotate with their respective spindles and to stir or agitate the seed in the hopper, whereby the operation of dropping is expedited. Fixed to the lower end of the spindles $b$ and adapted to revolve therewith are the circular dropping disks C, which are of a size in diameter equal to the interior diameter of the hoppers at their lower ends, and are provided with the openings C' through which the seed is adapted to pass. Arranged below the disks C, in the guideways $c$, are the seed boards $c'$ which are one for each hopper and which are provided with the segmental opening $c^2$ adapted to register with two of the openings C', whereby when two adjacent openings in the plate $c'$ register with the segmental opening $c^2$, the seed will be dropped from the hopper. The plates or boards $c'$ are arranged in the guideways $c$ so that they can be removed at will and others inserted in their stead. The object of this construction is to facilitate changing the amount of seed dropped. To this end a board such as the board D may be used when it is desired to drop a comparatively small amount of seed, for as this board has but one opening, it can register with but one of the openings C' of the disks C, and consequently but a small portion of seed is dropped. On the other hand the opening in the boards $c'$ being large enough to register contemporaneously with two of the openings C', a proportionately large amount of seed is dropped. It will be obvious that this relative arrangement of the disks and boards may be varied to an extent not shown here, so as to increase or diminish the amount of seed dropped.

Located below the hoppers B' and so as to receive the seed dropped therefrom are the bent chutes D' which are one for each hopper and which are attended by mechanism whereby they may be revolved so as to change at will the direction in which they open. The chutes themselves consist of a body or main portion $d$, which is of a size equal to the smallest diameter of the hoppers B' and the upper end of the body $d$ is arranged so as to be flush with the lower end of the hopper, thereby forming a continuation thereof. At the lower end of the main or body portion $d$ the chute begins to taper down and to curve on a line at right angles to the vertical line of the body. This curved or bent portion is practically the chute proper. Formed integral with the outer edge of the body $d$, is an annular flange $d'$ which is arranged at or near the lower end of the body and designed to operate in conjunction with the swinging tie arms or cleats E, which are segmental in general contour and pivoted at the ends E', their free ends being provided with the fastening device $e$, whereby they may be locked in place. These arms are provided on their edges which occur adjacent to the main or body portion of the chute D' with a rabbet groove $e'$ which is designed for the reception of the flange $d'$ of the chute. By this means it will be seen that the chutes D' are held firmly and immovably in place when the arms E are fastened together, but that the chutes may be revolved in either direction, or totally removed if desired, by loosening the fastening device $e$, and hence the pressure in the main portion $d$ of the chutes.

The mechanism for driving the spindles $b$ will now be described.

The reference letter F indicates a revolving shaft extending across the machine from hopper to hopper and journaled in the boxes F' fixed to the top of each hopper. This shaft has mounted on its middle the sprocket wheel $f$, which is keyed thereto and adapted to operate with the sprocket chain $f'$ through the medium of which chain the shaft is revolved. Fixed to the axle of the machine is a disk G, having its right hand face ratcheted or indented and adapted to engage with the oppositely ratcheted disk G' which is mounted loosely on the axle, adjacent to the disk G, and capable of a limited movement longitudinally on the axle, whereby the two disks are made to engage or disengage each other. This longitudinal movement of the disk G' is effected by means of the hand lever $g$, fulcrumed at $g'$ by means of a sliding connection $g^2$. Formed integral with or firmly secured to the periphery of the disk G' are the sprocket teeth $g^3$, over which the chain $f'$ operates. By this means motion is communicated from the axle to the shaft F, from whence it is transferred to the spindles $b$, by means of the miter gears H, keyed to the shaft ends and to the upper end of each of the spindles.

The mechanism for opening and closing the furrow will now be described.

Secured to the under side of the frame, and directly forward of the hopper mechanism is a way or guide H' which extends transversely across the frame and which is composed of two parallel rails connected at their ends by suitable cross-pieces. This way is adapted to hold and support the furrowing devices and to admit them to be adjusted laterally, thereby regulating the width of the rows.

$h$ and $h^4$ represent the furrowing devices which are two in number, but this may be varied at will; it is necessary, however, that the number should be equal to the number of seed hoppers, and they each consist of a body or main portion $h'$, provided at its upper end with the notches or recesses $h^2$ which are adapted for the reception of the rails of the guide H', and by this means the furrowing devices are firmly but adjustably secured in place. Formed in the main portion $h'$ and extending longitudinally from a point near its upper end to its lower extremity is a slot or passage $h^3$ in which is located and adapted to be longitudinally movable therein the furrower proper or plow I. This device is constructed with two slots or ways I' on the opposite sides thereof, which are each of a size equal to the thickness of the material of which the main portion $h'$ is constructed so that it will be capable of receiving and holding snugly yet slidably the edges of the main portion formed by the slot or passage $h^2$. Thus it will be seen that by this construction the plow I is secured to the main portion of the furrow opening and covering mechanism, and by means of its peculiar connection it may be extended or retracted at will.

Secured so as to be independently immovable on the upper end of the plow I, is the covering device $i$, which consists of the two rigid arms $i'$ secured one to each side of the plow I, and provided at their lower or free ends with the spade or coverer proper $i^2$, which consists of a blade provided with two points and curving rearwardly between the points so that when the device is in operation the two points will occur one on each side of the furrow formed by the point of the plow I, and tend to throw the dirt toward each other thereby filling the furrow and hence covering the seed. After the seed has been covered the trailing roller J is adapted to roll over the furrow and perform the necessary process of packing or rolling the dirt. This roller is revolubly mounted in the frame J' which is in turn pivoted to the arms $i'$ of the covering plow, the roller being kept on the earth by its gravity. The seed from the hoppers is delivered, when their respective furrowing devices are directly under them, from the chute D' into the funnel-shaped conductor K, the lower end of which empties between the arms $i'$ of the covering plow so that the seed will be dropped into the furrow immediately after it has been formed by the plow I, and immediately before the furrow is filled by the blade or spade $i^2$. The function of the construction of the furrow opening plow which admits the plow I and spade $i^2$ to move independently of its main portion, is to compensate for the inequalities in the surface of the ground, so that should there be a depression in the surface the furrow will be opened, seeded and covered in a manner just as effective as it would were the ground level. The reason for this is obvious, for the plow I, and coverer $i^2$ will by gravity drop into the depression and operate unaffected thereby. In order to restrain the movement of the plow and coverer within reasonable limits and yet to be able to adjust these limits to the variations in the surface of the ground, I provide the hand lever K' which is fulcrumed to the frame at K and provided with pawl and ratchet mechanism $k'$ whereby its position may be regulated. Attached to this lever is the chain L, which extends forward and at a point near the forward extremity of the frame it is connected to the two chains L' and $l$. These chains extend around their respective idler pulleys $l'$ and $l^2$ and from thence they diverge, one going to each of the furrow mechanism. At this point the chains L' and $l$ pass down through openings M in the main portion $h'$ of the furrow mechanism and are connected at their ends to the upper end of the plow or sliding portion I. By this arrangement it will be seen that the play of the plow I and its attached parts may be limited to any desired degree or entirely prevented by simply operating the hand lever K' so as to tighten the chains L, L' and $l$.

The lateral adjustment of the furrow mechanism whereby the width of the rows of seed is regulated is effected by means of the cords or chains M' and $m$. The chains M' are two in number and are connected one to each of the furrow mechanisms at the point $m'$ and from thence they extend inwardly toward the idlers $l'$ and $l^2$ where they pass over the winding spools or pulleys N, fixed to the vertical spindle N', such spindle being the same upon which the idlers $l'$ and $l^2$ are loosely mounted, and which may be revolved by means of the crank $n$, fixed to or formed integral with the upper end of the spindle N'. By this means the furrowing devices may be drawn toward the center of the machine by simply winding the chains M' over the spools N which will tighten the chains and cause the main portion $h'$ to travel along the guide way H'. The outward or the movement away from each other is effected by means substantially the same as those just described and these consist of the chains $m$ connected to the body $h'$ of the furrowing devices and attached at their remaining ends to the winding spools $n'$ fixed to spindles O, which are in turn journaled in the end pieces of the guideway H' and provided at their upper ends with the cranks O' by which they and their spools are revolved. It is obvious that upon winding up the cords or chains $m$, and allowing the spools N to be reversed, the furrowing devices will be drawn toward the sides of the machine. By means such as I have just described the furrowing devices may be moved to and held at any point in the guide way H' and thus the distance between the rows may be easily regulated.

In event of adjusting the furrow opening and covering mechanism on the guideway H' so as to place the funnel-shaped conductor K, out of reach of the chute D', I provide the devices of Fig. 10 which consist of extensible conductor-tubes or conduits $o$, adapted to be removably fitted to each other's ends and secured by the fastening devices O'. As many of these as may be necessary to connect the mouth of the chute D' and the upper end of the conductor K may be used and by their means the seed is effectively conducted from the hoppers to the furrow and dropping mechanism, no matter what be their relative positions. In a complete machine a series of these tubes or conduits $o$, will be provided and will constitute a part thereof, they being not necessarily carried around with the machine except when in use.

A seat P is fixed to the frame of the machine and in such a position that the hand levers K' and $g$ may be reached. Upon this seat the attendant or driver of the machine may be seated as is usually the custom with such machines.

In using my improvements the hoppers B' are filled with seed and the disks G and G' made to positively engage each other; this will, as the machine proceeds, communicate the motion of the axle to the shaft F and spindles $b$, and cause the agitators $b^2$ to stir the seed therein. Contemporaneous with this operation the disks C revolve in their respective hoppers and as the openings C' register with the openings $c^2$ of the plates $c'$ or D, as the case may be, the seed is dropped into the chute D' and thence into the conductor K. From this the seed gravitates into the furrow as formed by the plow I and is then covered by the spade or coverer $i^2$, and finally the whole is packed by the roller J.

Having thus described my invention, what I claim as new, and desire to secure by Letters Patent, is—

1. In a corn planter the combination, of a hopper provided with dropping mechanism, a chute leading therefrom, a slotted bar rigid on the machine and depending therefrom, a second chute on the bar and communicating with the first, a furrow opener provided with a shank arranged in the slot of the bar and movable longitudinally therein, and a furrow covering and rolling device pivotally connected to the shank of the opener, all substantially as described.

2. In a corn planter the combination of a seed hopper, a furrow opening device, a transverse guide-way in which the opener is arranged and capable of movement therein, an extensible chute leading from the hopper to the furrow opener and a system of ropes and winding spools connected to the furrow opener whereby it may be moved along the guide-way, substantially as described.

In testimony whereof I affix my signature in presence of two witnesses.

JAMES A. THOMPSON.

Witnesses:
LENT M. SHITCHEVEK,
WILLIAM A. NICHOLSON.